(12) United States Patent
Tobiason et al.

(10) Patent No.: US 10,168,189 B1
(45) Date of Patent: Jan. 1, 2019

(54) CONTAMINATION AND DEFECT RESISTANT OPTICAL ENCODER CONFIGURATION FOR PROVIDING DISPLACEMENT SIGNAL HAVING A PLURALITY OF SPATIAL PHASE DETECTORS ARRANGED IN A SPATIAL PHASE SEQUENCE ALONG A DIRECTION TRANSVERSE TO THE MEASURING AXIS

(71) Applicant: Mitutoyo Corporation, Kanagawa-ken (JP)

(72) Inventors: Joseph Daniel Tobiason, Bothell, WA (US); Akihide Kimura, Tokorozawa (JP); Shu Hirata, Kawasaki (JP)

(73) Assignee: Mitutoyo Corporation, Kanagawa-ken (JP)

( * ) Notice: Subject to any disclaimer, the term of this patent is extended or adjusted under 35 U.S.C. 154(b) by 26 days.

(21) Appl. No.: 15/637,750

(22) Filed: Jun. 29, 2017

(51) Int. Cl.
*G01D 5/347* (2006.01)

(52) U.S. Cl.
CPC ..... *G01D 5/34761* (2013.01); *G01D 5/34707* (2013.01)

(58) Field of Classification Search
CPC .......... G01D 5/34715; G01D 5/34792; G01D 5/347; G01D 5/34761; G01D 5/34707
USPC ............................................ 250/231.13, 239
See application file for complete search history.

(56) References Cited

U.S. PATENT DOCUMENTS

| | | | |
|---|---|---|---|
| 3,882,482 A | 5/1975 | Green et al. | |
| 4,109,389 A | 8/1978 | Balcom et al. | |
| 4,414,754 A | 11/1983 | Lapeyre | |
| 4,964,727 A | 10/1990 | Huggins | |
| 5,010,655 A | 4/1991 | Rieder et al. | |
| 5,237,391 A | 8/1993 | Huggins | |
| 5,239,178 A * | 8/1993 | Derndinger | G01B 9/04 250/234 |
| 5,279,044 A | 1/1994 | Bremer | |
| 5,442,166 A | 8/1995 | Hollmann | |
| 5,773,820 A | 6/1998 | Osajda et al. | |
| 5,774,219 A | 6/1998 | Matsuura | |
| 5,886,519 A | 3/1999 | Masreliez et al. | |
| 5,965,879 A | 10/1999 | Leviton | |

(Continued)

FOREIGN PATENT DOCUMENTS

JP 2003-65803 A 3/2003

*Primary Examiner* — Que T Le
(74) *Attorney, Agent, or Firm* — Seed IP Law Group LLP

(57) ABSTRACT

An optical encoder configuration comprises an illumination portion, a scale, and a photodetector configuration. The illumination portion transmits source light to a scale which outputs a periodic scale light pattern to the photodetector configuration. The photodetector configuration comprises a set of N spatial phase detectors arranged in a spatial phase sequence along a direction transverse to the measuring axis comprising two outer spatial phase detectors at a start and end of the sequence along the direction transverse to the measuring axis. At least a majority of the respective spatial phase detectors are relatively elongated along the measuring axis direction and relatively narrow along the direction perpendicular to the measuring axis direction, and comprise periodic scale light receptor areas positioned corresponding to a respective spatial phase of that spatial phase detector relative to the periodic scale light pattern, and are configured to provide a respective spatial phase detector signal.

19 Claims, 4 Drawing Sheets

(56) References Cited

U.S. PATENT DOCUMENTS

| | | |
|---|---|---|
| 8,493,572 B2 | 7/2013 | Milvich |
| 8,941,052 B2 | 1/2015 | Xie et al. |
| 9,018,578 B2 | 4/2015 | Tobiason et al. |
| 9,029,757 B2 | 5/2015 | Tobiason |
| 9,080,899 B2 | 7/2015 | Tobiason |

* cited by examiner

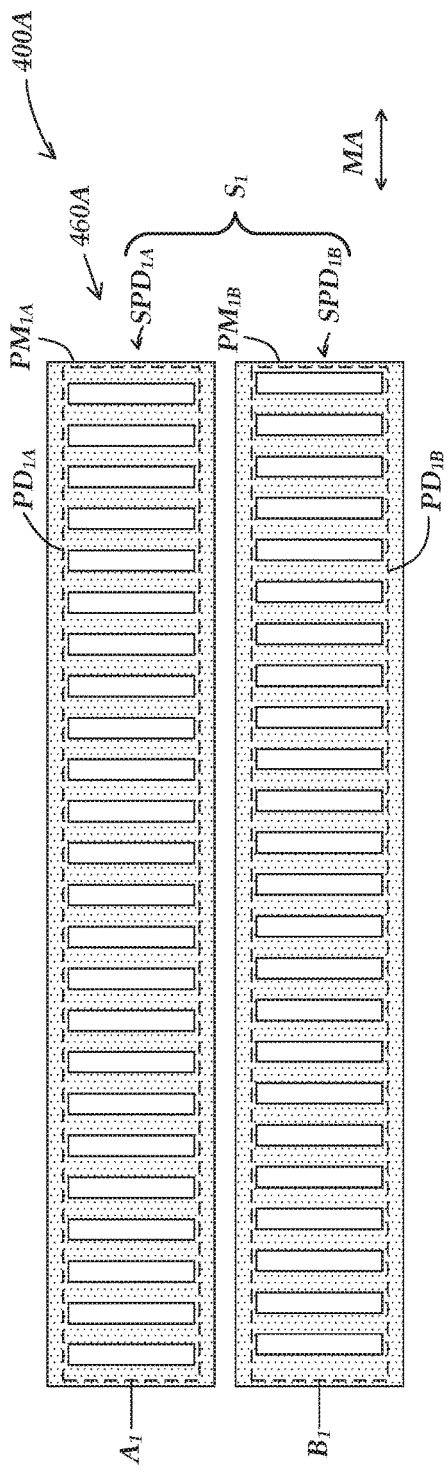
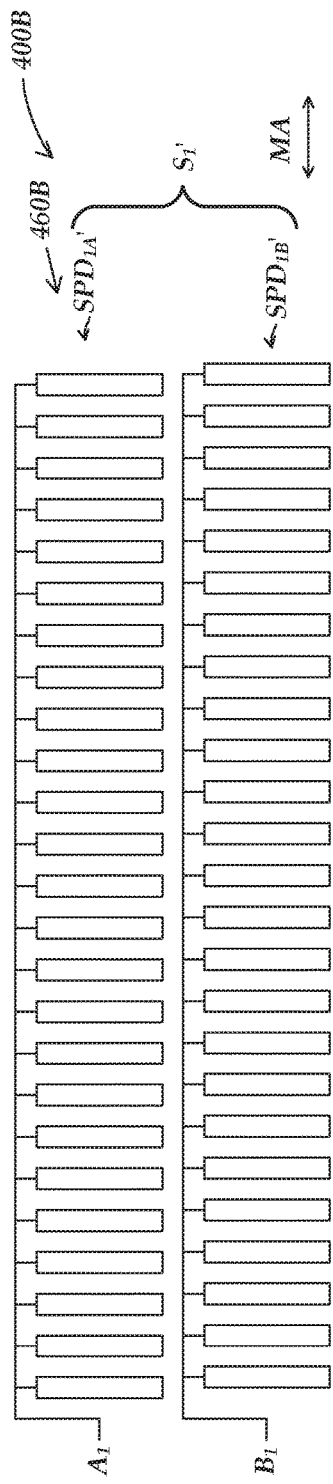
Fig. 4A.
Fig. 4B.

CONTAMINATION AND DEFECT RESISTANT OPTICAL ENCODER CONFIGURATION FOR PROVIDING DISPLACEMENT SIGNAL HAVING A PLURALITY OF SPATIAL PHASE DETECTORS ARRANGED IN A SPATIAL PHASE SEQUENCE ALONG A DIRECTION TRANSVERSE TO THE MEASURING AXIS

BACKGROUND

Technical Field

The invention relates generally to precision position or displacement measurement instruments, and more particularly to an encoder configuration with signal processing which is resistant to errors that may be associated with a contaminated or defective portion of a scale.

Description of the Related Art

Optical position encoders determine the displacement of a readhead relative to a scale that includes a pattern that is detected by the readhead. Typically, position encoders employ a scale that includes at least one scale track that has a periodic pattern, and the signals arising from that scale track are periodic as a function of displacement or position of the readhead along the scale track. Absolute type position encoders may use multiple scale tracks to provide a unique combination of signals at each position along an absolute scale.

Optical encoders may utilize incremental or absolute position scale structures. An incremental position scale structure allows the displacement of a readhead relative to a scale to be determined by accumulating incremental units of displacement, starting from an initial point along the scale. Such encoders are suitable for certain applications, particularly those where line power is available. In low power consumption applications (e.g., battery powered gauges and the like), it is more desirable to use absolute position scale structures. Absolute position scale structures provide a unique output signal, or combination of signals, at each position along a scale, and therefore allow various power conservation schemes. U.S. Pat. Nos. 3,882,482; 5,965,879; 5,279,044; 5,886,519; 5,237,391; 5,442,166; 4,964,727; 4,414,754; 4,109,389; 5,773,820; and 5,010,655 disclose various encoder configurations and/or signal processing techniques relevant to absolute position encoders, and are hereby incorporated herein by reference in their entirety.

Some encoder configurations realize certain advantages by utilizing an illumination source light diffraction grating in an illumination portion of the encoder configuration. U.S. Pat. Nos. 8,941,052; 9,018,578; 9,029,757; and 9,080,899, each of which is hereby incorporated herein by reference in its entirety, disclose such encoder configurations. Some of the configurations disclosed in these patents may also be characterized as utilizing super resolution moiré imaging.

In various applications, scale manufacturing defects or contaminants such as dust or oils on a scale track may disturb the pattern detected by the readhead, creating errors in the resulting position or displacement measurements. In general, the size of errors due to a defect or contamination may depend on factors such as the size of the defect or contamination, the wavelength of the periodic pattern on the scale, the size of the readhead detector area, the relationship between these sizes, and the like. A variety of methods are known for responding to abnormal signals in an encoder. Almost all such methods are based on disabling the encoder signals, or providing an "error signal" to warn the user, or adjusting a light source intensity to boost low signals, or the like. However, such methods do not provide a means of continuing accurate measurement operations despite the abnormal signals that arise from certain types of scale defects or contamination. Therefore these methods have limited utility. One known method that does mitigate the effects of scale contaminants or defects on measurement accuracy is disclosed in Japanese Patent Application JP2003-065803 (the '803 Application). The '803 Application teaches a method wherein two or more photo detectors output periodic signals having the same phase, which are each input to respective signal stability judging means. The signal stability judging means only outputs signals that are judged to be "normal," and "normal" signals are combined as the basis for position measurement. Signals that are "abnormal" are excluded from position measurement calculations. However, the methods of judging "normal" and "abnormal" signals disclosed in the '803 Application have certain disadvantages that limit the utility of the teachings of the '803 Application.

U.S. Pat. No. 8,493,572 (the '572 patent) discloses a contamination and defect resistant optical encoder configuration which provides a means to select signals from photodetector elements which are not subject to contamination. However the '572 patent relies on complex signal processing that may be less desirable in some applications.

Improved methods for providing accurate measurement operations that avoid or mitigate abnormal signals that arise from certain types of scale defects or contamination without the need for complex signal processing would be desirable.

BRIEF SUMMARY

A contamination and defect resistant optical encoder configuration for providing displacement signals is disclosed. The contamination and defect resistant optical encoder configuration comprises an illumination portion, a scale, and a photodetector configuration. The illumination portion transmits source light to the scale along a source light path. The scale extends along a measuring axis direction, and comprises a periodic pattern comprising bars that are narrow along the measuring axis direction and elongated along a Y direction perpendicular to the measuring axis direction, and that are arranged periodically along the measuring axis direction. The scale inputs the source light along the source light path and outputs scale light along a scale light path. The photodetector configuration receives a periodic scale light pattern from the scale along a scale light path. The periodic scale light pattern displaces past the photodetector configuration corresponding to a relative displacement between the scale and the photodetector configuration along the measuring axis direction. The photodetector configuration comprises a set of N spatial phase detectors arranged in a spatial phase sequence along a direction transverse to the measuring axis, where N is an integer that is at least 6 and the spatial phase sequence comprises two outer spatial phase detectors at a start and end of the sequence along the direction transverse to the measuring axis and an interior group of spatial phase detectors located between the two outer spatial phase detectors. At least a majority of the respective spatial phase detectors are relatively elongated along the measuring axis direction and relatively narrow along the direction perpendicular to the measuring axis direction, and comprise scale light receptor areas that are spatially periodic along the measuring axis direction and positioned corresponding to a respective spatial phase of that spatial phase detector relative to the periodic scale light pattern, and are configured to provide a respective spatial phase detector signal. Each spatial phase detector in the interior group is preceded and followed in the spatial phase sequence by spatial phase detectors that have respective spatial phases that are different from that spatial phase detector and different from each other.

BRIEF DESCRIPTION OF THE SEVERAL VIEWS OF THE DRAWINGS

The foregoing aspects and many of the attendant advantages will become more readily appreciated as the same become better understood by reference to the following detailed description, when taken in conjunction with the accompanying drawings, wherein:

FIG. 4A is a schematic diagram of a portion of a photodetector configuration of a contamination and defect resistant optical encoder configuration.

FIG. 4B is a schematic diagram of a portion of a photodetector configuration of a contamination and defect resistant optical encoder configuration.

DETAILED DESCRIPTION

Figure 1:
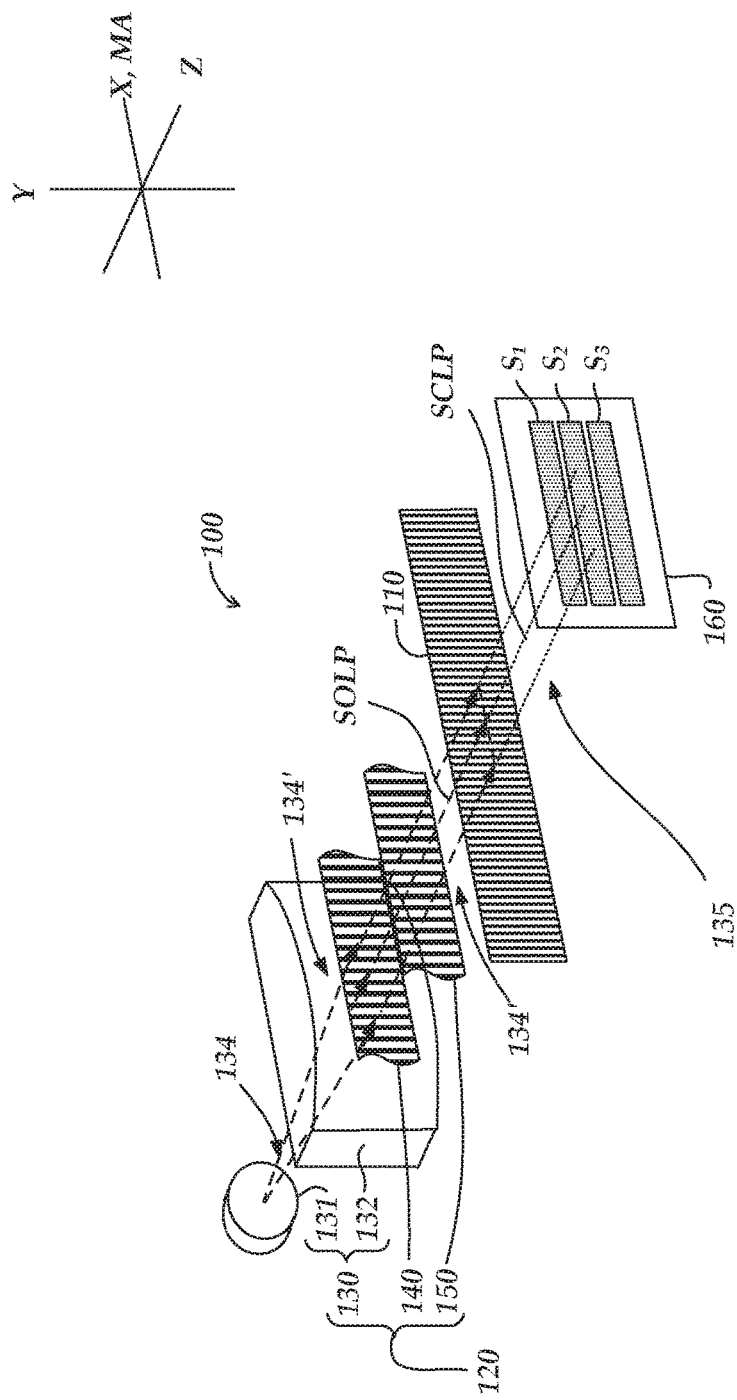
FIG. 1 is a partially schematic exploded diagram of a contamination and defect resistant optical encoder configuration for providing displacement signals.

FIG. 1 is a partially schematic exploded diagram of a contamination and defect resistant optical encoder configuration 100 for providing displacement signals. The encoder configuration 100 comprises a scale grating 110, an illumination portion 120, and a photodetector configuration 160.

FIG. 1 shows orthogonal X, Y, and Z directions, according to a convention used herein. The X and Y directions are parallel to the plane of the scale grating 110, with the X direction parallel to a measuring axis direction MA (e.g., perpendicular to elongated pattern elements of the scale grating 110). The Z direction is normal to the plane of the scale grating 110.

In the implementation shown in FIG. 1, the scale grating 110 is a transmissive grating. The scale grating 110 extends along a measuring axis direction MA, and comprises a periodic pattern comprising bars that are narrow along the measuring axis direction MA and elongated along a perpendicular to the measuring axis direction MA (i.e., the Y direction), and that are arranged periodically along the measuring axis direction MA.

The illumination portion 120 comprises an illumination source 130, a first illumination grating 140, and a second illumination grating 150. The illumination source 130 comprises a light source 131, and a collimating lens 132. The light source 131 is configured to output source light 134 to the collimating lens 132. The collimating lens 132 is configured to receive the source light 134 and output collimated source light 134' to the first illumination grating 140. The first illumination grating 140 receives the source light 134' and diffracts the source light 134' toward the second illumination grating 150. The second illumination grating 150 receives the source light 134' and further diffracts the source light 134' toward the scale grating 110 along a source light path SOLP. The scale grating 110 inputs the source light 134' along the source light path SOLP and outputs scale light comprising a periodic scale light pattern 135 along a scale light path SCLP to the photodetector configuration 160. The photodetector configuration 160 receives the periodic scale light pattern 135 from the scale grating 110 along the scale light path SCLP. The periodic scale light pattern 135 displaces past the photodetector configuration 160 corresponding to a relative displacement between the scale grating 110 and the photodetector configuration 160 along the measuring axis direction MA. An example of a photodetector configuration similar to the photodetector 160 is shown in detail FIG. 3. The photodetector configuration 160 comprises a set of N spatial phase detectors arranged in a spatial phase sequence along a direction transverse to the measuring axis direction MA (i.e., the Y direction), where N is an integer that is at least 6 and the spatial phase sequence comprises two outer spatial phase detectors at a start and end of the sequence along the direction transverse to the measuring axis and an interior group of spatial phase detectors located between the two outer spatial phase detectors. In the implementation shown in FIG. 1, the set of N spatial phase photodetectors comprises 3 subsets of spatial phase detectors $S_1$, $S_2$, and $S_3$ that have the same subset spatial phase sequence.

At least a majority of the respective spatial phase detectors are relatively elongated along the measuring axis direction MA and relatively narrow along the direction perpendicular to the measuring axis direction MA (i.e., the Y direction), and comprise scale light receptor areas that are spatially periodic along the measuring axis direction MA and positioned corresponding to a respective spatial phase of that spatial phase detector relative to the periodic scale light pattern, and are configured to provide a respective spatial phase detector signal. Each spatial phase detector in the interior group is preceded and followed in the spatial phase sequence by spatial phase detectors that have respective spatial phases that are different from that spatial phase detector and different from each other.

In various applications, the photodetector configuration 160 and the illumination portion 120 may be mounted in a fixed relationship relative to one another, e.g., in a readhead or gauge housing (not shown), and are guided along the measuring axis direction MA relative to the scale grating 110 by a bearing system, according to known techniques. The scale grating 110 may be attached to a moving stage, or a gauge spindle, or the like, in various applications.

It should be appreciated that the contamination and defect resistant optical encoder configuration 100 is only one example of a contamination and defect resistant optical encoder configuration according to the principles disclosed herein. In alternative implementations, various optical components may be utilized such as a telecentric imaging system, limiting apertures, and the like. In alternative implementations, an illumination portion may comprise only a single illumination grating.

Figure 2:
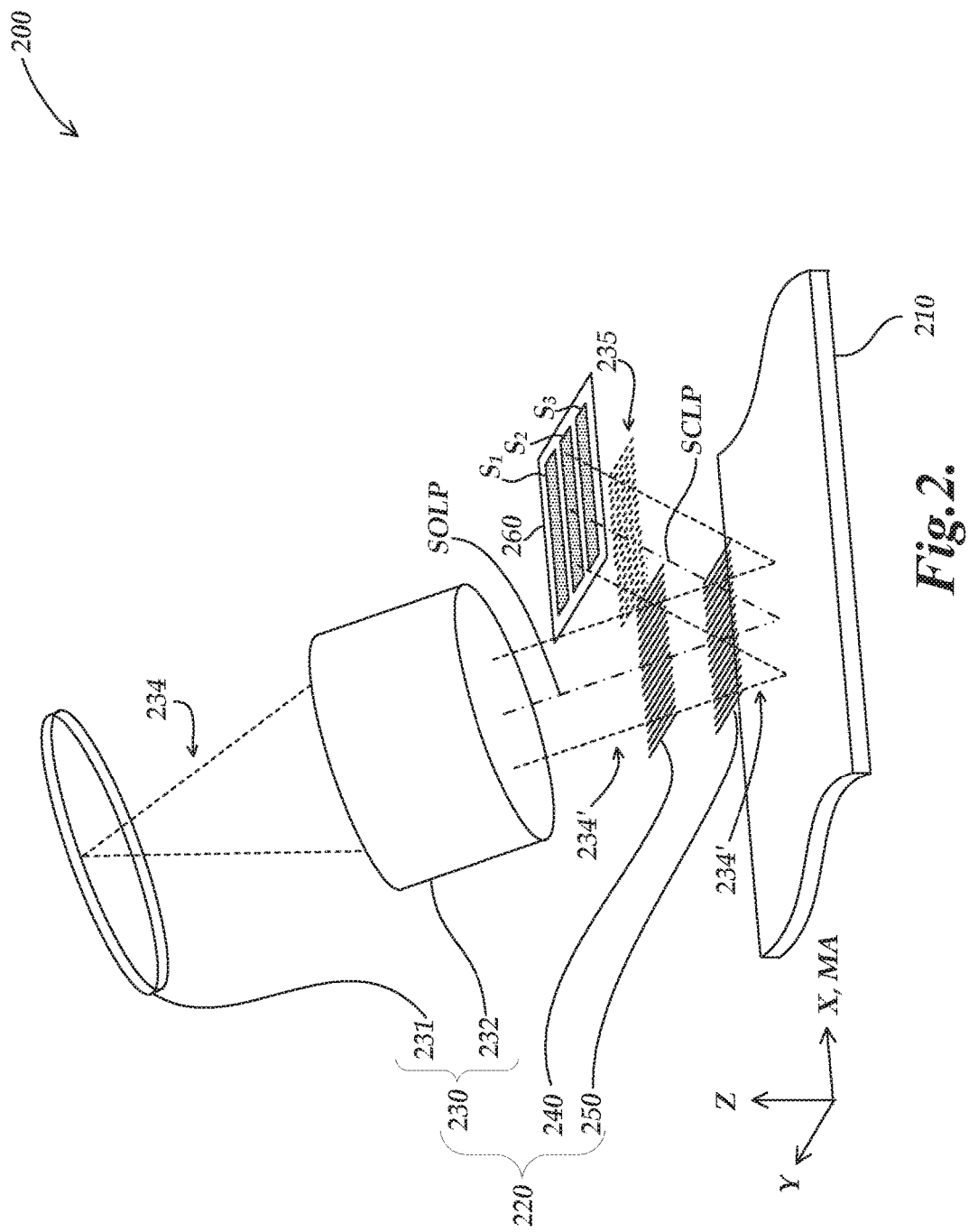
FIG. 2 is a partially schematic diagram of a contamination and defect resistant optical encoder configuration for providing displacement signals.

FIG. 2 is a partially schematic diagram of a contamination and defect resistant optical encoder configuration 200 for providing displacement signals. The optical encoder configuration 200 is similar to the encoder configuration 100. Similar references numbers 2XX in FIGS. 2 and 1XX in FIG. 1, may refer to similar elements unless otherwise indicated by context or description. The encoder configuration 200 shown in FIG. 2 is a reflective configuration. Scale 210 is a reflective scale grating.

Figure 3:
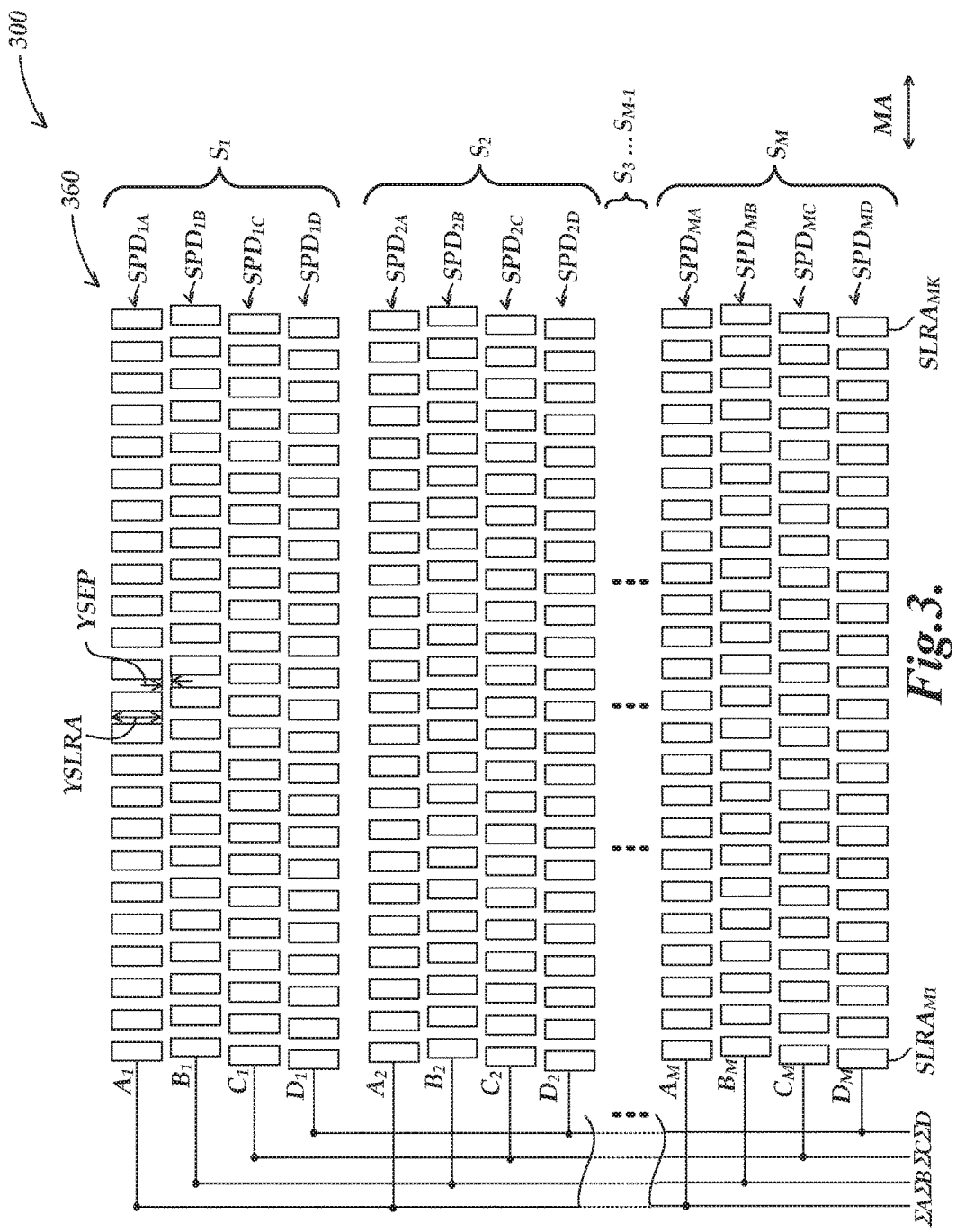
FIG. 3 is a partially schematic diagram of a photodetector configuration of a contamination and defect resistant optical encoder configuration.

FIG. 3 is a partially schematic diagram of a photodetector configuration 360 of a contamination and defect resistant optical encoder configuration 300. The contamination and defect resistant optical encoder configuration 300 may be similar to the contamination and defect resistant optical encoder configuration 100 or the contamination and defect resistant optical encoder configuration 200. The photodetector configuration 360 comprises a set of N spatial phase detectors arranged in a spatial phase sequence along a direction transverse to the measuring axis direction MA, where N is an integer that is at least 6 and the spatial phase sequence comprises two outer spatial phase detectors at a start and end of the sequence along the direction transverse to the measuring axis and an interior group of spatial phase detectors located between the two outer spatial phase detectors. At least a majority of the respective spatial phase detectors are relatively elongated along the measuring axis direction MA and relatively narrow along the direction perpendicular to the measuring axis direction MA, and comprise scale light receptor areas that are spatially periodic along the measuring axis direction MA and positioned corresponding to a respective spatial phase of that spatial phase detector relative to the periodic scale light pattern, and are configured to provide a respective spatial phase detector signal. Each spatial phase detector in the interior group is preceded and followed in the spatial phase sequence by spatial phase detectors that have respective spatial phases that are different from that spatial phase detector and different from each other.

In some implementations, the set of N spatial phase photodetectors may comprise at least M subsets of spatial phase detectors, where M is an integer that is at least 2, and wherein each of the M subsets includes spatial phase detectors that provide each of the respective spatial phases included in the set of N spatial phase photodetectors. In some implementations, M may be at least 3. In some implementations, M may be at least 6. In some implementations, each of the M subsets of spatial phase detectors may comprise spatial phase detectors that provide the same respective spatial phases arranged in the same subset spatial phase sequence. FIG. 3 shows an implementation with M subsets of spatial phase detectors indicated as $S_1$ through $S_M$. The subset $S_1$ comprises spatial phase detectors $SPD_{1A}$, $SPD_{1B}$, $SPD_{1C}$, and $SPD_{1D}$. The subset $S_2$ comprises spatial phase detectors $SPD_{2A}$, $SPD_{2B}$, $SPD_{2C}$, and $SPD_{2D}$. The subset $S_M$ comprises spatial phase detectors $SPD_{MA}$, $SPD_{MB}$, $SPD_{MC}$, and $SPD_{MD}$. Each of the spatial phase detectors in FIG. 3 is shown to have K scale light receptor areas. As an example of scale light receptor areas, the spatial phase detector $SPD_{MD}$ is labeled with scale light receptor areas $SLRA_{M1}$ and $SLRA_{MK}$. In some implementations, K may be an even value.

In the implementation shown in FIG. 3, the spatial phase sequence is indicated by spatial phase detectors including subscript indices A, B, C, and D (e.g., the spatial phase detectors $SPD_{1A}$, $SPD_{1B}$, $SPD_{1C}$, and $SPD_{1D}$). The spatial phase detectors with subscript indices A and D are the two outer spatial phase detectors at the start and end of each instance of the spatial phase sequence. The spatial phase detectors with subscript indices B and C are the interior groups.

The spatial phase detectors $SPD_{1A}$, $SPD_{1B}$, $SPD_{1C}$, and $SPD_{1D}$ output respective spatial phase detector signals $A_1$, $B_1$, $C_1$, and $D_1$. The spatial phase detectors $SPD_{2A}$, $SPD_{2B}$, $SPD_{2C}$, and $SPD_{2D}$ output respective spatial phase detector signals $A_2$, $B_2$, $C_2$, and $D_2$. The spatial phase detectors $SPD_{MA}$, $SPD_{MB}$, $SPD_{MC}$, and $SPD_{MD}$ output respective spatial phase detector signals $A_M$, $B_M$, $C_M$, and $D_M$.

A contamination and defect resistant optical encoder configured according to the principles disclosed herein provides a simple design which may be tolerant to contaminants (e.g., wirebonding contamination) which are as large as 100 micrometers and scale defects which are as large as 300 micrometers. Contaminants or defects on a scale will typically produce a common mode error component on adjacent spatial phase detectors which may be canceled out in signal processing (e.g., quadrature processing). Spatial phase detectors which are relatively elongated along the measuring axis direction MA and relatively narrow along the direction perpendicular to the measuring axis direction MA provide better resistance to contamination and defects. Signal levels may change more slowly by decreasing the frequency of the structure of the spatial phase detectors along the measuring axis direction MA. Furthermore, such an encoder does not require complex signal processing to provide tolerance to contamination and defects. Signals provided by the set of N spatial phase detectors may be processed according to standard techniques known to one skilled in the art.

In some implementations such as the implementation shown in FIG. 3, N is at least 8 and each subset of spatial phase detectors may comprise 4 spatial phase detectors having respective spatial phases separated by 90 degrees. In alternative implementations, each subset of spatial phase detectors may comprise 3 spatial phase detectors having respective spatial phases separated by 120 degrees.

In the implementation shown in FIG. 3, the photodetector configuration 360 includes connections configured to combine spatial phase detector signals corresponding to the same respective spatial phase and to output each such combination as a respective spatial phase position signal. The photodetector configuration 360 is configured to output 4 spatial phase position signals corresponding to spatial phases separated by 90 degrees. Spatial phase signals with the same letter designation (e.g., $A_1$, $A_2$, and $A_M$) are combined (e.g., summed) to provide spatial phase signals $\Sigma A$, $\Sigma B$, $\Sigma C$, and $\Sigma D$. In alternative implementations, a photodetector configuration may be configured to output 3 spatial phase position signals corresponding to spatial phases separated by 120 degrees. In either case, spatial phase position signals may be further utilized to determine displacement signals, e.g., through quadrature or three phase signal processing.

In some implementations, each of the respective spatial phase detectors may be relatively elongated along the measuring axis direction MA and relatively narrow along the direction perpendicular to the measuring axis direction MA, and may comprises scale light receptor areas that are spatially periodic along the measuring axis direction MA and positioned corresponding to a respective spatial phase of that spatial phase detector relative to the periodic scale light pattern, and may be configured to provide a respective spatial phase detector signal.

In some implementations, a dimension YSLRA of the scale light receptor areas of each of the N spatial phase detectors along the Y direction may be at most 250 micrometers. In some implementations, YSLRA may be at least 5 micrometers.

In some implementations, a separation distance YSEP between the scale light receptor areas of each adjacent pair of the N spatial phase detectors along the Y direction may be at most 25 micrometers.

In some implementations, a dimension YSLRA of the scale light receptor areas of each of the N spatial phase detectors may be the same along the Y direction. In some implementations, a separation distance YSEP between the scale light receptor areas of each adjacent pair of the N spatial phase detectors may be the same along the Y direction.

It should be appreciated that while a large value of N provides greater robustness to contamination, there is a tradeoff in that a large value of N may provide smaller signal levels within each individual spatial phase detector.

FIG. 4A is a schematic diagram of a portion of a photodetector configuration 460A of a contamination and defect resistant optical encoder configuration 400A. For simplicity, FIG. 4A only shows one subset of spatial phase detectors $S_1$ with two spatial phase detectors $SPD_{1A}$ and $SPD_{1B}$. It should be appreciated that the photodetector 460A comprises at least six spatial phase detectors according to the principles disclosed herein, but only two are shown for simplicity. In the implementation shown in FIG. 4A, each of the N spatial phase detectors (e.g., spatial phase detectors $SPD_{1A}$ and $SPD_{1B}$) comprises a photodetector (e.g., photodetectors $PD_{1A}$ and $PD_{1B}$ indicated by dashed lines) covered by a spatial phase mask (e.g., phase masks $PM_{1A}$ and $PM_{1B}$) that blocks the photodetector from receiving the periodic scale light pattern except through openings included in the spatial phase mask. In this case, the scale light receptor areas comprise areas of the photodetectors (e.g., the photodetectors $PD_{1A}$ and $PD_{1B}$) that are exposed through the openings in the respective spatial phase masks (e.g., the spatial phase masks $PM_{1A}$ and $PM_{1B}$). In the implementation shown in FIG. 4A, the scale light receptor areas (i.e., the openings) of the phase mask $PM_{1B}$ are offset relative to the scale light receptor areas the phase mask $PM_{1A}$ along the measuring axis direction MA by 90 degrees. It should be appreciated that the while the spatial phase masks $PM_{1A}$ and $PM_{1B}$ are schematically illustrated as separate portions in FIG. 4A, in some implementations, they may be conveniently constructed with the same material in the same process to eliminate any potential positioning errors.

FIG. 4B is a schematic diagram of a portion of a photodetector configuration 460B of a contamination and defect resistant optical encoder configuration 400B. For simplicity, FIG. 4B only shows one subset of spatial phase detectors $S_1'$ with two spatial phase detectors $SPD_{1A}'$ and $SPD_{1B}'$. It should be appreciated that the photodetector 460B comprises at least six spatial phase detectors according to the principles disclosed herein, but only two are shown for simplicity. In the implementation shown in FIG. 4B, each of the N spatial phase detectors (e.g., spatial phase detectors $SPD_{1A}'$ and $SPD_{1B}'$) comprises a periodic array of electrically interconnected photodetector areas that receive the periodic scale light pattern. In this case, the scale light receptor areas comprise the photodetector areas of the periodic array of photodetectors. In the implementation shown in FIG. 4B, the photodetector areas of the spatial phase detector $SPD_{1B}'$ are offset relative to the photodetector areas of the spatial phase detector $SPD_{1A}'$ along the measuring axis direction MA by 90 degrees.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A contamination and defect resistant optical encoder configuration for providing displacement signals, comprising:
    an illumination portion that transmits source light to a scale along a source light path;
    a scale that extends along a measuring axis direction, the scale comprising a periodic pattern comprising bars that are narrow along the measuring axis direction and elongated along a Y direction perpendicular to the measuring axis direction, and that are arranged periodically along the measuring axis direction, the scale inputting the source light along the source light path and outputting scale light along a scale light path; and
    a photodetector configuration that receives a periodic scale light pattern from the scale along a scale light path, the periodic scale light pattern displacing past the photodetector configuration corresponding to a relative displacement between the scale and the photodetector configuration along the measuring axis direction, wherein:
        the photodetector configuration comprises a set of N spatial phase detectors arranged in a spatial phase sequence along a direction transverse to the measuring axis, where N is an integer that is at least 6 and the spatial phase sequence comprises two outer spatial phase detectors at a start and end of the sequence along the direction transverse to the measuring axis and an interior group of spatial phase detectors located between the two outer spatial phase detectors;
        at least a majority of the respective spatial phase detectors are relatively elongated along the measuring axis direction and relatively narrow along the direction perpendicular to the measuring axis direction, and comprise scale light receptor areas that are spatially periodic along the measuring axis direction and positioned corresponding to a respective spatial phase of that spatial phase detector relative to the periodic scale light pattern, and are configured to provide a respective spatial phase detector signal; and
        each spatial phase detector in the interior group is preceded and followed in the spatial phase sequence by spatial phase detectors that have respective spatial phases that are different from that spatial phase detector and different from each other.

2. The contamination and defect resistant optical encoder configuration of claim 1, wherein the set of N spatial phase photodetectors comprises at least M subsets of spatial phase detectors, where M is an integer that is at least 2, and wherein each of the M subsets includes spatial phase detectors that provide each of the respective spatial phases included in the set of N spatial phase photodetectors.

3. The contamination and defect resistant optical encoder configuration of claim 2, wherein M is at least 3.

4. The contamination and defect resistant optical encoder configuration of claim 2, wherein M is at least 6.

5. The contamination and defect resistant optical encoder configuration of claim 2, wherein each of the M subsets of spatial phase detectors comprises spatial phase detectors that provide the same respective spatial phases arranged in the same subset spatial phase sequence.

6. The contamination and defect resistant optical encoder configuration of claim 5, wherein each subset of spatial phase detectors comprises 3 spatial phase detectors having respective spatial phases separated by 120 degrees.

7. The contamination and defect resistant optical encoder configuration of claim 5, wherein N is at least 8 and each subset of spatial phase detectors comprises 4 spatial phase detectors having respective spatial phases separated by 90 degrees.

8. The contamination and defect resistant optical encoder configuration of claim 1, wherein the photodetector configuration includes connections configured to combine spatial phase detector signals corresponding to the same respective spatial phase and to output each such combination as a respective spatial phase position signal.

9. The contamination and defect resistant optical encoder configuration of claim 8, wherein the photodetector configuration is configured to output 3 spatial phase position signals corresponding to spatial phases separated by 120 degrees.

10. The contamination and defect resistant optical encoder configuration of claim 8, wherein the photodetector configuration is configured to output 4 spatial phase position signals corresponding to spatial phases separated by 90 degrees.

11. The contamination and defect resistant optical encoder configuration of claim 1, wherein each of the respective spatial phase detectors is relatively elongated along the measuring axis direction and relatively narrow along the direction perpendicular to the measuring axis direction, and comprises scale light receptor areas that are spatially periodic along the measuring axis direction and positioned corresponding to a respective spatial phase of that spatial phase detector relative to the periodic scale light pattern, and is configured to provide a respective spatial phase detector signal.

12. The contamination and defect resistant optical encoder configuration of claim 1, wherein a dimension YSLRA of the scale light receptor areas of each of the N spatial phase detectors along the Y direction is at most 250 micrometers.

13. The contamination and defect resistant optical encoder configuration of claim 11, wherein a separation distance YSEP between the scale light receptor areas of each adjacent pair of the N spatial phase detectors along the Y direction is at most 25 micrometers.

14. The contamination and defect resistant optical encoder configuration of claim 1, wherein a dimension YSLRA of the scale light receptor areas of each of the N spatial phase detectors along the Y direction is at least 5 micrometers.

15. The contamination and defect resistant optical encoder configuration of claim 1, wherein a dimension YSLRA of the scale light receptor areas of each of the N spatial phase detectors is the same along the Y direction.

16. The contamination and defect resistant optical encoder configuration of claim 15, wherein a separation distance YSEP between the scale light receptor areas of each adjacent pair of the N spatial phase detectors is the same along the Y direction.

17. The contamination and defect resistant optical encoder configuration of claim 1, wherein each of the N spatial phase detectors comprises a photodetector covered by a spatial phase mask that blocks the photodetector from receiving the periodic scale light pattern except through openings included in the spatial phase mask, wherein the scale light receptor areas comprise areas of the photodetector that are exposed through the openings in the spatial phase mask.

18. The contamination and defect resistant optical encoder configuration of claim 1, wherein each of the N spatial phase detectors comprises a periodic array of electrically interconnected photodetector areas that receive the periodic scale light pattern, wherein the scale light receptor areas comprise the photodetector areas of the periodic array of photodetectors.

19. The contamination and defect resistant optical encoder configuration of claim 1, wherein each of the N spatial phase detectors comprises an even number of scale light receptor areas.

* * * * *